Nov. 12, 1963  H. HARDY  3,110,061
INJECTION MOLDING APPARATUS
Filed May 24, 1962  2 Sheets-Sheet 1

INVENTOR.
HENRY HARDY
BY
Dike, Thompson, Bronstein & Wrose
ATTORNEYS

Nov. 12, 1963  H. HARDY  3,110,061
INJECTION MOLDING APPARATUS
Filed May 24, 1962  2 Sheets-Sheet 2

INVENTOR.
HENRY HARDY
BY
Dike, Thompson, Bronstein & Mrose
ATTORNEYS

United States Patent Office 3,110,061
Patented Nov. 12, 1963

3,110,061
INJECTION MOLDING APPARATUS
Henry Hardy, Cambridge, Mass., assignor to International Vulcanizing Corporation, Boston, Mass., a corporation of Massachusetts
Filed May 24, 1962, Ser. No. 197,360
9 Claims. (Cl. 18—30)

The present invention relates to improvements in injection molding of articles, such as footwear, involving the use of split molds, and, in one particular aspect, to novel and improved automatic injection molding apparatus including provisions which insure proper alignment of parts and proper injection of molding materials into split molds used in manufacture of molded footwear.

As is well known in the shoe-manufacturing art, soles and heels of certain types of footwear may advantageously be molded directly upon and bonded integrally with the bottom portions of lasted uppers. Rubber or flexible plastics have been used for these purposes, and the associated metal molds have been designed in split form for separations which permit withdrawal of the molded product without damage to the peripheral edges of the outsole or heel. Particularly in those instances when the split mold parts are designed for automatic powered closure, as in the case of indexed molding stations of an automatic injection molding machine, the cooperating mold parts tend to become misaligned because of the permissible relative displacements designed into their supports to accommodate substantial thermal expansions and contractions of the heated mold parts. Such misalignments not only result in misalignments between the molded parts of the finished products but also tend to prevent proper injection of the molding material into the mold because this injection commonly must be performed at the very site of a mold split. In accordance with the present teachings, however, these disadvantages are overcome through use of a special coupling mechanism of uncomplicated construction which is active intermediate an injection nozzle and split mold assembly to compel the mold parts to reach precise alignment and to minimize wear and likelihood of faulty registration of the nozzle with the mold inlet passageway.

It is one of the objects of the present invention, therefore, to provide novel and improved injection molding apparatus for precision manufacture of products in split molds.

A further object is to provide injection molding apparatus for automated manufacture of footwear parts, in which registrations of portions of a split mold and of an injection nozzle with the mold are automatically assured by simple auxiliary equipment of low-cost manufacture.

By way of a summary account of practice of this invention in one of its aspects, there is provided a molding device having an injection nozzle mounted for reciprocating movements into and out of cooperating relationship with different ones of movable indexed carriers of stations each including a split mold two parts of which may be articulated toward and away from one another. The split mold parts are formed, conventionally, of relativily soft metal, such as an aluminum alloy, which is a good conductor of the heat involved in molding, and which may be machined easily to develop the desired mold cavity shapes and surface patterns desired on the finished product. It is important that molding material which solidifies in an inlet passageway leading from the nozzle to a mold cavity be readily removable, to this end, the inlet passageway is formed between surfaces at the site of the joint between the split mold parts. The latter parts are mounted on steel guides for sliding articulations into and out of connection with one another, the mountings being relatively loose, however, such that relative temperature-induced dimensional variations, as between the wear-resisting steel guides and heat-conducting aluminum mold parts, cannot result in jamming. Because of the required looseness in the mountings of the split mold parts, these would tend to become misaligned were it not for movable auxiliary coupling and alignment plates having surfaces designed to engage surfaces of the mold parts and force them into precise alignment when thrust toward them by the movable injection nozzle. For these purposes, each steel auxiliary plate is mounted on a different mold carrier and is spring-biased in direction to engage first the movable injection nozzle and then to be carried by it into forceful engagement with the mold parts. A socketing opening in each plate receives and mates accurately with the injection nozzle, and provides a short passageway for the molded material to be coupled into the inlet passageway of the mold parts, the respective passageways being kept in registration by the plate mountings.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIGURE 1 provides a partly cross-sectioned and partly pictorial plan view of portions of an indexed station and cooperating injection nozzle in improved automated equipment for injection molding of bottoms of footwear;

Figure 4:
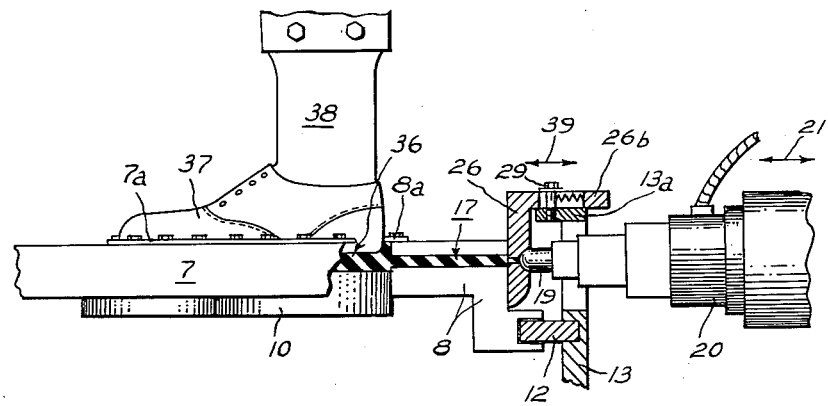
Figure 5:
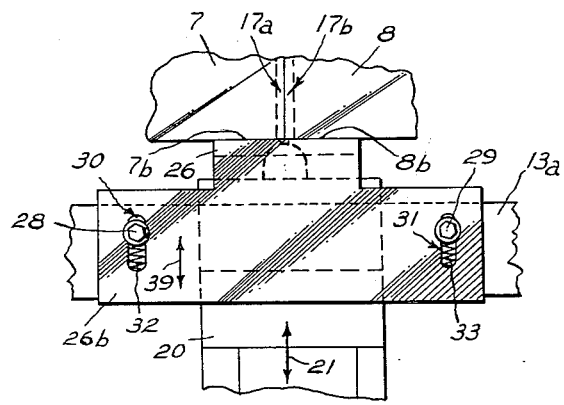
Figure 6:
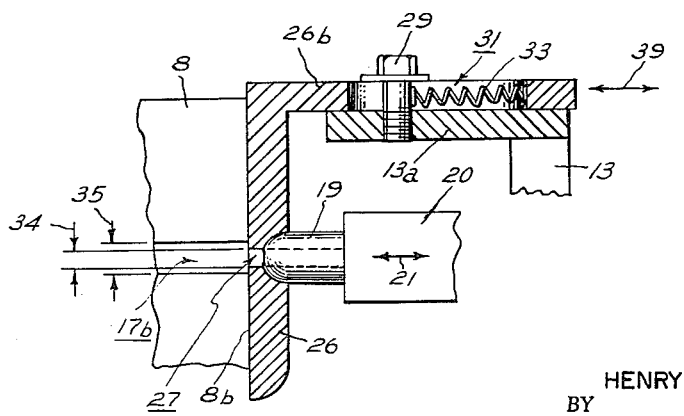

FIGURE 4 provides a side pictorial view, partly sectioned and partly broken away, of the improved molding station operating upon an article of footwear;

FIGURE 5 is a detail, viewed from the top, portraying an injection nozzle, split mold, and alignment and coupling unit in operative interconnection; and FIGURE 6 is a cross-sectioned side view of the elements detailed in FIGURE 5.

Figure 1:
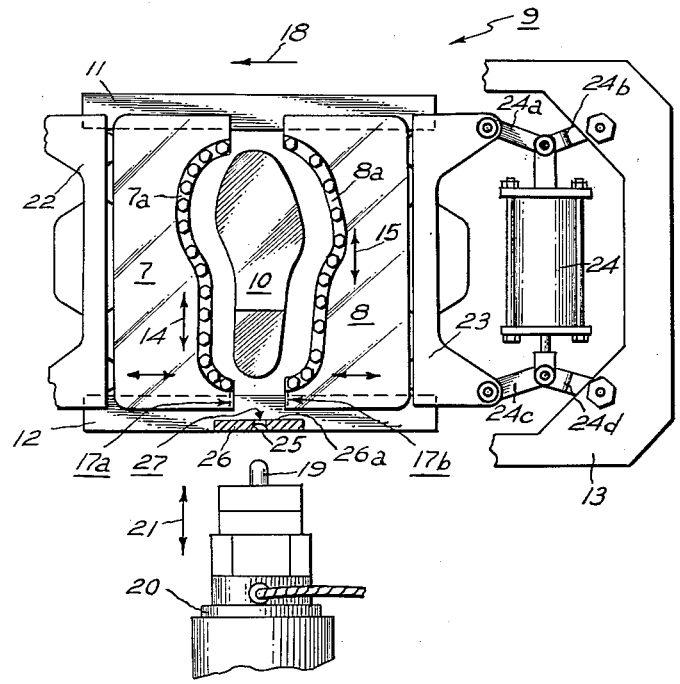
Figure 2:
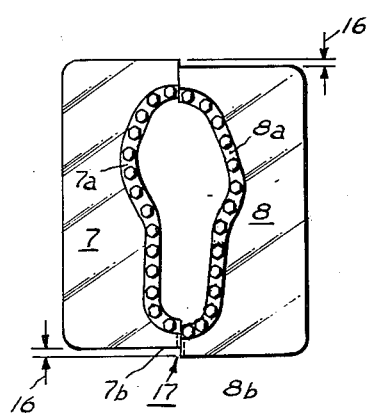
FIGURE 2 is a plan view of misaligned split halves of a footwear mold.

The embodying apparatus portrayed in FIGURE 1 includes the split halves, 7 and 8, of part of a footwear mold, mounted on one movable indexed carrier or station, 9, of an automatic injection molding machine. These split mold halves cooperate with a third, sole-shaped, mold element, 10, about which they may be closed to form an open-topped cavity designed to receive an assembled footwear upper and to shape a plastic sole and heel structure which is to be molded integrally with it. Side or "welt" plates, 7a and 8a, respectively are fastened atop the split halves of the mold to aid in fashioning a simulated welt, and to make tight-fitting engagement with the footwear article which will effectively close the mold cavity while plastic is forced into it under pressure. The split halves 7 and 8 are precisely machined along the planar split surfaces which are to abut one another, and each is also grooved at fore and aft ends to receive and slide laterally on parallel stiff guide rails 11 and 12 which are fixed with the mold carrier framework 13. It is desirable that the molding involve somewhat elevated temperatures, and it is in part for this reason, and in part for purposes of facilitating machining of mold shapes, that the mold parts 7 and 8 are made of a relatively soft and lightweight aluminum alloy having good thermal conductivity. The thermal coefficient of expansion and contraction of these parts is enough different from that of the sturdy steel guide rails on which they slide so that the resulting clearances at certain temperatures tend to promote relative displacements of these mold parts in the fore-aft directions designated by arrows 14 and 15. These displacements, shown by exaggerated dimensions 16 in FIGURE 2, would cause the mold halves to produce a correspondingly misaligned and imperfect molded product and, moreover, would cause the inlet passageway 17 for the molded material to develop troublesome leakage.

The mold parts, and their mountings and actuating mechanisms, are carried by the sturdy framework 13 as it is advanced automatically in the direction of arrow 18 to an indexed position wherein the inlet passageway for the molded material is substantially aligned with the nozzle 19 of the injection mechanism 20. It should be understood that many such mold carriers or stations are commonly involved in high-speed automatic equipment, although only one has been illustrated, and that these are successively indexed into the injection site by known forms of conveyor mechanisms. When a mold carrier such as carrier 9 has been properly indexed, with the split mold parts 7 and 8 closed about mold part 10 and the bottom of a shoe upper, the injection nozzle 19 is advanced for coupling with the inlet passageway of the mold and a supply of plastic in fluid condition is then forced into the mold cavity, filling it. The nozzle is then retracted and the filled mold carrier is moved to one side while another unfilled carrier is being indexed into the injection site. Injection mechanism 20 is of a known type which produces the desired reciprocating motions of nozzle 19, in the directions of arrows 21. Closure and separation of the split mold parts 7 and 8 are effected by an automatic mechanism including pressure plates 22 and 23 actuated by toggle mechanisms such as that including the pressurized fluid motor 24 and its associated toggle linkages 24a–24d.

Figure 3:
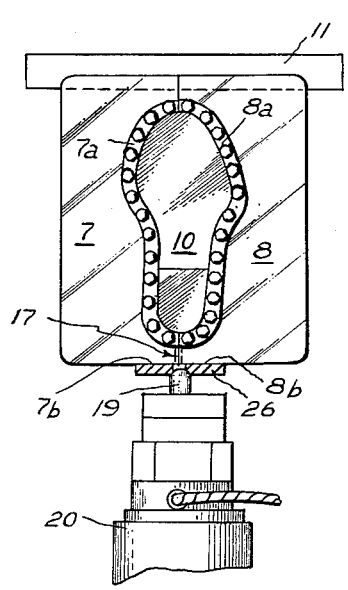
FIGURE 3 illustrates the mold elements and injection nozzle of the FIGURE 1 equipment in a fully-mated condition, together with an alignment and coupling unit.

Inlet passage 17 which couples the plastic into the mold cavity from nozzle 19 is formed by grooving in the two split mold parts 7 and 8, groove halves 17a and 17b respectively being recessed inwardly from the foreward planar surfaces of these parts which are to abut one another when the mold parts are closed. Separation of the mold parts thus permits solidified plastic in the inlet passageway to be parted, removed and trimmed with a minimum of difficulty. Past practice has involved shaping of the outer end of inlet passage 17 to form a socket-type coupling into which the nozzle 19 of a complementary configuration may be seated directly. However, because the socketing is at the locus of the split, the nozzle thrust then acts to separate the two mold halves and promote leakage of the pressurized plastic; further, any lateral displacement of the mold halves, such as that characterized in FIGURE 2, also tends to develop leakage; and, moreover, the nozzle-seating surfaces in the relatively soft metal of the mold halves are highly susceptible to wear and can become leaky after a short time of use. Escape of plastic near the nozzle during injection is particularly troublesome in that the high injection pressures then become effective over large areas and can develop reverse thrusts on the injection mechanism which further unseat the nozzle and disrupt the molding process. According to the present teachings, however, outer surfaces of the inlet passageway 17 is not directly mated in seating relationship with nozzle 19. Instead, the rounded steel nozzle 19 mates with the rounded seat 25 of an intermediate steel member 26 which has a short passageway 27 communicating with the bottom of the seat and leading to the inlet passageway 17. Member 26 also has a substantially flat rear surface 26a which is disposed to engage the flat frontal edge surfaces 7b and 8b (FIGURES 2 and 5) of the split mold halves. Pressures applied to this intermediate member by the injection mechanism cause it to thrust the split mold halves into precise alignment against rear guide 11, as illustrated in FIGURE 3, with the relatively broad areas of contact involved inhibiting wear and deformation of the softer mold metal.

Intermediate member 26 is supported as a "floating" element in two respects: first, the recess 25 forms a ball-and-socket type coupling with nozzle 19, permitting the rear surfaces 26a of this member to seek and flatten themselves against the forward edge surfaces 7b and 8b of the mold halves; and, second, this member is mounted on the framework 13 with freedom for sliding movements toward and away from a biased position in which it is normally spaced from the mold halves (FIGURE 1). The latter mounting is depicted in FIGURES 5 and 6, from which it is evident that member 26 is in the form of an angle plate, the upper portion 26b of which rests atop a frontal bar-like portion 13a of the carrier framework 13 and is held slidably thereon by a pair of bolts 28 and 29 passing through slots 30 and 31, respectively, which are elongated in the fore-and-aft direction corresponding to the directions of injection nozzle movement 21. Compressed springs 32 and 33 in slots 30 and 31 are effective between the bolts 28 and 29 and the forward ends of the slots, urging the intermediate member 26 forward to a biased position in which it is normally out of engagement with the mold halves. The split mold may therefore be opened and closed without interference from this member. The socketing recess in member 26 is at all times oriented in position for self-centering socketing with the injection nozzle. As the nozzle 19 is advanced for an injection, it first engages and seats itself in the socketing recess 25 of member 26; thereafter the powered nozzle thrusts member 26 rearwardly, against the opposing forces of springs 32 and 33, until its rear planar surface 26a engages the front edges 7b and 8b of the mold halves. If these edges are not in alignment, member 26 forces them both against the steel rear guide rail 11 until they can move no further, at which time they must be accurately aligned despite any dimensional variations which may have taken place in both as the result of temperature changes. The short injection passageway or auxiliary sprue 27 appearing in member 26 is at this time in registration with the inlet passageway or main sprue 17 leading to the mold cavity, although exact concentricity is not essential because the passageway 27 is intentionally formed with a smaller diameter, 34, (FIGURE 6), than the diameter 35 of mold inlet passageway 17. This relationship of the sizes of the sprues insures that the injection pressures will not be applied against the edge surfaces 7b and 8b of the mold halves, where the effect could be to force the member 26 rearwardly away from the mold, with ensuing leakage. Once the mold halves and intermediate member 26 are firmly engaged, the injection of plastic may be commenced and the mold cavity 36 (FIGURE 4) filled. In this process, the footwear upper 37, supported on a form 38, is bonded integrally with the injection-molded plastic. Injection is terminated automatically, in accordance with known techniques, and the nozzle 19 is then retracted, the spring-biased member 26 following its motion for a short distance until stopped by engagement with the framework element 13a. Motions of intermediate member 26 are thus generally in the directions of arrows 39 in the course of the advancement and retraction of the injection nozzle.

Like advantageous results may be secured when the intermediate coupling and alignment member is mounted upon the movable injection mechanism 20, rather than upon the carrier framework 13. And, it should be appreciated also that the male and female characters of the nozzle and intermediate member may be reversed, and that the injection mechanism may in certain practices remain wholly stationary while the mold carrier is reciprocated into and out of engagement with its nozzle. Accordingly, while specific practices have been described, and while a preferred embodiment constructed of preferred materials has been described, it should be understood that various changes, modifications, additions and substitutions may be effected by those skilled in the art without departure from these teachings, and it is aimed

What I claim as new and desire to secure by Letters Patent of the United States is:

1. Apparatus for forming injection-molded items in split molds, comprising a mold carrier including a framework, at least two split mold parts mounted on said framework for movements into and out of closed abutting engagement, said mold parts having an injection passageway formed at their junction, an injection mechanism having a nozzle for injecting molding material into said passageway, said carrier and nozzle being mounted for relative movements varying the separations between said nozzle and said injection passageway, coupling and alignment means disposed in the path of said relative movements between said carrier and nozzle, means supporting said coupling and alignment means in normally spaced relationship to said split mold parts and for movement into engagement with said mold parts, said coupling and alignment means having a coupling shaped to mate with said nozzle and to pass molding material to said injection passageway and having surfaces disposed to engage and force said split mold parts into alignment along their junction when said carrier and nozzle are brought together with said coupling and alignment means between them.

2. Apparatus for forming injection-molded items in split molds, comprising a mold carrier including a framework, at least two split mold parts movably mounted on said framework for closure and separation, said mold parts having a sprue formed at their junction, an injection mechanism having a nozzle for injecting molding material into said sprue, said carrier and nozzle being mounted for relative movements varying the separations between said nozzle and sprue, a coupling and alignment member disposed in the path of said relative movements between said carrier and nozzle, means supporting said coupling and alignment member in normally spaced relationship to said split mold parts and for movement into engagement with said two mold parts, said coupling and alignment member having coupling surfaces shaped to mate with said nozzle and to pass molding material to said sprue and having surfaces disposed to engage and force said two split mold parts into alignment when said carrier and nozzle are brought together with said coupling and alignment member between them.

3. Apparatus for forming injection-molded items in split molds, comprising a mold carrier including a framework, at least two split mold parts shaped for junction along a substantially linear path, means loosely mounting said split mold parts for sliding closure and separation movements on said framework in directions substantially perpendicular to the linear path of said junction, said mold parts having a sprue formed at said junction, an injection mechanism having a nozzle for injecting molding material into said sprue, said carrier and nozzle being mounted for relative movements varying the separations between said nozzle and sprue, coupling and alignment means disposed in the path of said relative movements between said carrier and nozzle, means supporting said coupling and alignment means in normally spaced relationship to said split mold parts and for movement into engagement with said mold parts, said coupling and alignment means having a coupling shaped to mate with said nozzle and to pass molding material to said sprue and having surfaces disposed to engage and force said split mold parts into alignment along said linear path of said junction when said carrier and nozzle are brought together with said coupling and alignment means between them.

4. Apparatus for forming injection-molded items in split molds as set forth in claim 3 wherein said means loosely mounting said split mold parts includes means having stopping surfaces fixed in relation to said framework and disposed for engagement with each of said mold parts which aligns said mold parts along said path when said mold parts are forced by said coupling and alignment means.

5. Apparatus for forming injection-molded footwear items in split molds, comprising a mold carrier including a framework, front and rear guides fixed with said framework, at least two split mold parts slidably mounted loosely on said guides for movements to and from closure along a substantially linear fore-and-aft path extending transversely to the directions of the sliding movements, said mold parts having a sprue formed at their junction along said path, an injection mechanism having a nozzle for injecting molding material into said sprue, said carrier and nozzle being mounted for relative movements along said fore-and-aft path which vary the separations between said nozzle and sprue, a coupling and alignment member disposed in the path of said relative movements between said carrier and nozzle, means supporting said coupling and alignment member in normally spaced relationship to said split mold parts and for movement along said fore-and-aft path into engagement with said mold parts, said coupling and alignment member having surfaces shaped for coupling with said nozzle and to pass molding material to said sprue and having relatively broad-area surfaces disposed to engage and force said two mold parts against the rear guide and into alignment along said fore-and-aft path when said carrier and nozzle are brought together with said member between them.

6. Apparatus for forming injection-molded footwear iems in split molds as set forth in claim 5 wherein said rear guide comprises a rigid guide rail, wherein said coupling and alignment member and said nozzle are of steel, and wherein said split mold parts are of a heat-conducting alloy softer than that of said member and nozzle.

7. Apparatus for forming injection-molded footwear items in split molds as set forth in claim 5 wherein said supporting means mounts said coupling and alignment member on said carrier framework at the front thereof and includes resilient means urging said member forwardly away from said split mold parts, whereby said split mold parts may slide to and from closure without interference from said member and whereby said nozzle must engage said member before said member engages said mold parts when said carrier and nozzle are brought together with said member between them.

8. Apparatus for forming injection-molded footwear items in split molds as set forth in claim 6 wherein said mold carrier is substantially stationary along said fore-and-aft path and said injection mechanism includes means for reciprocating said nozzle relative to said carrier along said path, and wherein said supporting means includes means resiliently urging said member toward said nozzle and away from said mold parts, whereby said mold parts may slide to and from closure without interference from said member and whereby said nozzle must engage said member before said member engages said mold parts when said nozzle is moved toward said carrier by said injection mechanism.

9. Apparatus for forming injection-molded footwear items in split molds as set forth in claim 8 wherein said coupling surfaces of said steel member are in recessed socket form and said nozzle is of a rounded complementary shape, whereby the coupling between said nozzle and member forms a ball-and-socket joint, and wherein said coupling surfaces of said member are in communication with a short passageway leading to and of smaller cross-sectional area than the exposed end of said sprue in said mold parts.

References Cited in the file of this patent
UNITED STATES PATENTS

| | | |
|---|---|---|
| 2,994,920 | Patera | Aug. 8, 1961 |
| 3,029,468 | Valyi | Apr. 17, 1962 |